United States Patent [19]
Nakamura

[11] Patent Number: 5,986,719
[45] Date of Patent: Nov. 16, 1999

[54] VIDEO SIGNAL CLAMPING METHOD AND APPARATUS WITH NEGATIVE PEAK DETECTION

[75] Inventor: Katsufumi Nakamura, Cambridge, Mass.

[73] Assignee: Analog Devices, Inc., Norwood, Mass.

[21] Appl. No.: 08/654,850

[22] Filed: May 28, 1996

[51] Int. Cl.⁶ ................................................. H04N 07/18
[52] U.S. Cl. ......................... 348/682; 348/683; 348/685
[58] Field of Search ................................ 348/500, 525, 348/676, 682, 683, 684, 685, 687, 689, 695, 697

[56] References Cited

U.S. PATENT DOCUMENTS

| | | | |
|---|---|---|---|
| 4,631,589 | 12/1986 | Hongu et al. | 348/697 |
| 5,270,819 | 12/1993 | Watson | 348/682 |
| 5,341,173 | 8/1994 | Hyeon | 348/525 |
| 5,371,552 | 12/1994 | Brummette et al. | 348/697 |
| 5,461,489 | 10/1995 | Ohara et al. | 348/689 |
| 5,486,869 | 1/1996 | Cooper | 348/525 |
| 5,497,201 | 3/1996 | Ogawa et al. | 348/525 |
| 5,500,688 | 3/1996 | Mok | 348/697 |
| 5,526,058 | 6/1996 | Sano et al. | 348/647 |
| 5,528,303 | 6/1996 | Bee et al. | 348/531 |
| 5,614,851 | 3/1997 | Holzer et al. | 327/58 |
| 5,686,974 | 11/1997 | Nayebi et al. | 348/705 |
| 5,760,844 | 6/1998 | Jorden | 348/691 |

*Primary Examiner*—Anand S. Rao
*Attorney, Agent, or Firm*—Wolf, Greenfield & Sacks, P.C.

[57] ABSTRACT

A video clamping apparatus is described which uses transistors manufactured in a CMOS process to clamp an input video signal to a reference level during a SYNC period. A closed-loop system is provided which includes a buffer amplifier, a sample-and-hold device, a summer, a low-pass filter and a clamping circuit. The summer compares the output of the sample-and-hold device to a reference voltage which causes an output of an analog-to-digital converter to be the digital word zero.

In order to maintain a high enough bandwidth of the closed loop system, a first current source is operatively coupled to the transistors of the clamping circuit during the SYNC period. When the SYNC period has ended, the first current source is decoupled from the transistors of the clamping circuit. The transconductance of the loop is, therefore, high when needed during the SYNC period. A second current source, smaller than the first current source, is coupled to the clamping circuit when SYNC period is not present so as to control droop during the horizontal scan.

27 Claims, 7 Drawing Sheets

VIDEO SIGNAL CLAMPING METHOD AND APPARATUS WITH NEGATIVE PEAK DETECTION

BACKGROUND OF THE INVENTION

1. Field of the Invention

The present invention relates to a video signal clamping method and apparatus to clamp a composite video signal at a reference level. The invention is specifically directed to a video clamp circuit using MOSFETs.

2. Discussion of the Related Art

Video signals are processed in many different applications including televisions, video capture equipment, VCRs and camcorders. Over the years, the features and complexity of these machines have increased while, in some cases, their physical size has decreased. As a result, it has become necessary to provide video signal processing circuitry in smaller packages requiring less power consumption.

As shown in FIG. 1, a conventional video signal acquisition system 100 includes an input line 114 connected to one node of a capacitor 116. A second node of capacitor 116 is connected to an input element of a buffer amplifier 118. An output of the buffer amplifier 118 is connected to an input of a sample-and-hold amplifier 110. An output of the sample-and-hold amplifier 110 is operatively coupled to an input of an analog-to-digital converter (ADC) 112. An output of the ADC 112 is operatively coupled to digital signal processing (DSP) circuitry. Further, a clamping circuit 120 is operatively coupled to a reference signal $V_{REF}$ and also operatively coupled to the input to the buffer amplifier 118.

In operation, a video signal is provided at line 114 and then AC-coupled through the capacitor 116, of capacitance $C_{in}$. The video signal is filtered by the capacitor 116 to remove the DC level from the video signal. The filtered video signal is provided as an input to the buffer amplifier 118 which conventionally amplifies the signal and provides a buffered filtered video signal as an output. The buffered video signal output of the amplifier 118 is provided to the sample-and-hold device 110. The sample-and-hold device 110 samples (and "holds") the output of the amplifier 118 and provides a sampled signal to the ADC 112. The ADC digitizes the sampled signal. The digital output word of the ADC 112 then is provided to the DSP circuitry.

By AC-coupling the video input signal to the circuitry, a user is provided with a flexible choice of input DC-level. Prior to the sampled video signal being digitized by the ADC 112, however, DC clamping should be performed to establish a signal reference level. In other words, a DC reference is provided for the filtered video signal so that the ADC 112 outputs a digital word representing zero when the level of the filtered video signal is at its lowest point; thus, maximum headroom and consistent signal processing are provided.

As shown in FIG. 2, a composite video signal 200 has a built-in synchronization interval, represented as a SYNC pulse, which interval is used (by convention) to determine a reference level. The SYNC pulse is repeated for each scan line of an image. DC clamping is provided to adjust the DC value of the bottom level of the SYNC pulse such that the output of the ADC 112 then is equal to the zero level output code. As an example, using the NTSC standard, one horizontal scan is shown as being approximately 63.5 μsec in duration with the SYNC pulse having a duration of approximately 5 μsec. DC clamping must occur during the SYNC pulse duration so that subsequent parts of the video signal can be accurately retrieved. As shown in FIG. 1, a clamp circuit 120 is provided to clamp the video signal at one end of the ADC range, "signal zero," thereby making maximum use of the limited headroom when low voltage power supplies are used. In an acquisition mode, the analog frontend must recover the SYNC pulse from the signal in order to activate the clamp circuit.

One conventional approach to providing a DC-clamp circuit is shown in FIG. 3A. In the open-loop circuit shown, the capacitor 116 is connected between the input line 114 and node 304 at an input of the buffer amplifier 118. A resistor 302 is connected between the node 304 and a reference voltage $V_{REF}$. The reference voltage $V_{REF}$ is the voltage that, when applied to the ADC 112 through the buffer amplifier 118 and the sample-and-hold device 110, results in the zero level output code from the ADC 112.

As above, the capacitor 116 filters the video signal and provides a filtered video signal to the buffer amplifier 118. Since the DC component of the video signal has been removed, the resistor 302 operatively couples the filtered signal at node 304 to the reference level $V_{REF}$. This circuit, however, is not optimum for a video application which requires an accurate setting of the reference level. In operation, the voltage level at node 304 is not sufficiently "pulled down" to the reference level $V_{REF}$.

Rather, the average of the voltage level at node 304 is equal to $V_{REF}$. As a result, when the bottom of the SYNC pulse is received as an input, zero level output code from the ADC 112 does not result.

An alternative conventional approach is shown in FIG. 3B. In the circuit shown, also an open-loop circuit, the capacitor 116 is connected in the same manner as that of FIG. 3A. Instead of resistor 302, however, a diode 306 is provided with its cathode connected to node 304 and its anode connected to the reference voltage $V_{REF}$. During operation, when the SYNC pulse pulls the voltage at node 304 low, the diode 306 will turn on and will maintain the voltage level at node 304 equal to $V_{REF}-V_{BE}$ ($V_{BE}$ being the p-n junction voltage drop across the diode which is turned on). Where A is the gain of amplifier 118, the reference level $V_{REF}$ would be set so that $A*(V_{REF}-V_{BE})$ is equal to the zero reference level of the ADC 112. At the end of the SYNC pulse, the positive-going edge thereof will turn the diode off and node 304 will float in response to the filtered input video signal. It is important, however, to ensure that the voltage at node 304 is less than the reference voltage $V_{REF}$ prior to clamping. Otherwise, proper clamping will not occur.

There are disadvantages to using the diode clamp as shown in FIG. 3B. It is known that a leakage current associated with the diode 306 will cause the DC level to droop during the horizontal scan of the video signal. In video applications, a certain, but small, amount of droop due to leakage current can be tolerated. The purpose of leakage current is to make sure that even if the voltage at node 304 is higher than $V_{REF}$, the leakage current will make sure that the voltage will eventually be less than $V_{REF}$. The problem is that the leakage current in the diode 306 can vary significantly from diode to diode due to processing discrepancies and such variations, which cannot be known or predicted, can affect the DC level. Further, the tolerance of the gain A of the amplifier, in combination with the leakage current of the diode 306, can also affect the accuracy of the ADC 112.

A low power DC clamping circuit which can detect a SYNC pulse from a standard composite video signal and clamp the incoming signal to a reference level during the SYNC pulse while consuming relatively little power is desired.

SUMMARY OF THE INVENTION

A video clamp circuit is provided to clamp an incoming video signal to a reference level to provide a maximum amount of headroom for an analog-to-digital converter range using a low voltage power supply. The video clamp circuit of the present invention uses transistors manufactured in a CMOS process to implement a closed loop circuit which detects the SYNC pulse in the composite video signal, clamps the incoming video signal to the reference level and provides a controlled low droop during the horizontal scan.

One embodiment of the present invention, aimed at overcoming the drawbacks associated with prior art clamping circuits, is directed to a video signal processing circuit that includes an input circuit that receives the video signal and outputs an AC-coupled video signal, a buffer amplifier, a sample-and-hold amplifier, a low pass filter operatively coupled to the sample-and-hold amplifier that outputs a low-pass filtered video signal on a filter output and a clamp circuit operatively coupled to the low pass filter that receives the low-pass filtered video signal and outputs a control signal to the buffer amplifier input.

In one embodiment of the invention, the clamp circuit includes a MOS transistor having a gate operatively coupled to the low-pass filter output and a switch having a control element and first, second and third switch elements, the control element being operatively coupled to the low-pass filter output. A first current source is operatively coupled to the second switch element and a second current source, different from the first current source, is operatively coupled to the third switch element. The switch operatively couples the first switch element to the second switch element according to a first state of the low-pass filter output and operatively couples the first switch element to the third switch element according to a second state of the low-pass filter output.

In an alternate embodiment of the present invention, a clamp circuit for establishing a signal reference level includes a first current mirror circuit operatively coupled to a switch circuit. A first current source is operatively coupled to the switch circuit, the first current source providing a first current. A transconductance circuit is operatively coupled to the first current mirror circuit and a second current mirror circuit is operatively coupled to the transconductance circuit and the switch circuit. A second current source is operatively coupled to the switch circuit, the second current source providing a second current. The switch circuit operatively couples the first current to an output line according to a first state of an inverted input signal and operatively couples the second current source to the output line according to a second state of the inverted input signal. The first current supplied by the first current source is larger than the second current supplied by the second current source.

In another embodiment of the invention, the transconductance circuit includes a first MOS transistor and a second MOS transistor.

BRIEF DESCRIPTION OF THE DRAWINGS

These and other features and advantages of the present invention will be readily appreciated as the same becomes better understood by reference to the accompanying drawings, in which like reference numerals designate like or corresponding parts throughout, wherein.

DETAILED DESCRIPTION

Figure 1:
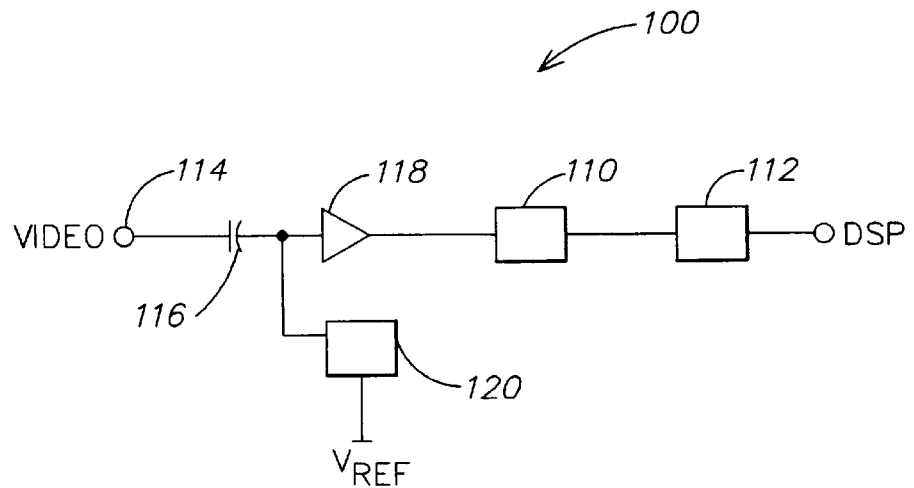
FIG. 1 is a block diagram of a conventional video signal processing system.
Figure 2:
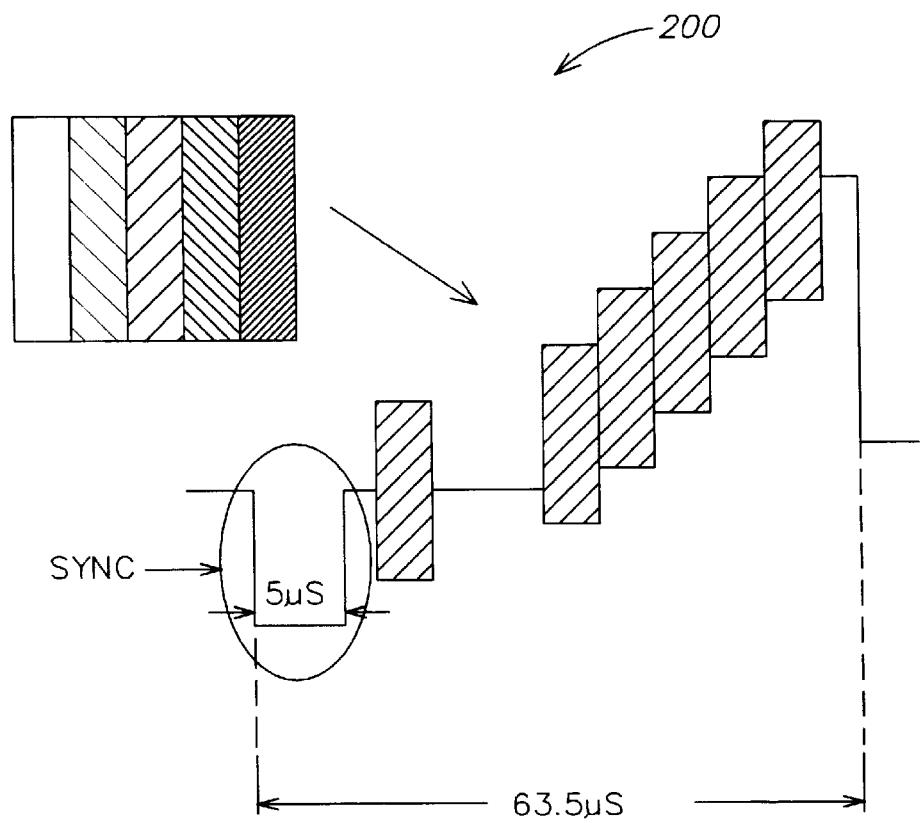
FIG. 2 is a representation of a composite video signal.
Figure 3A:
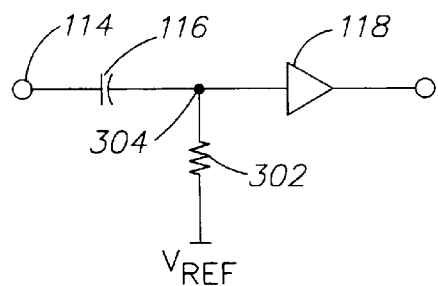
FIGS. 3A and 3B are conventional circuits for providing a DC level.
Figure 3B:
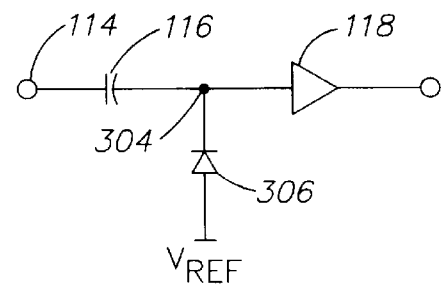
Figure 4:
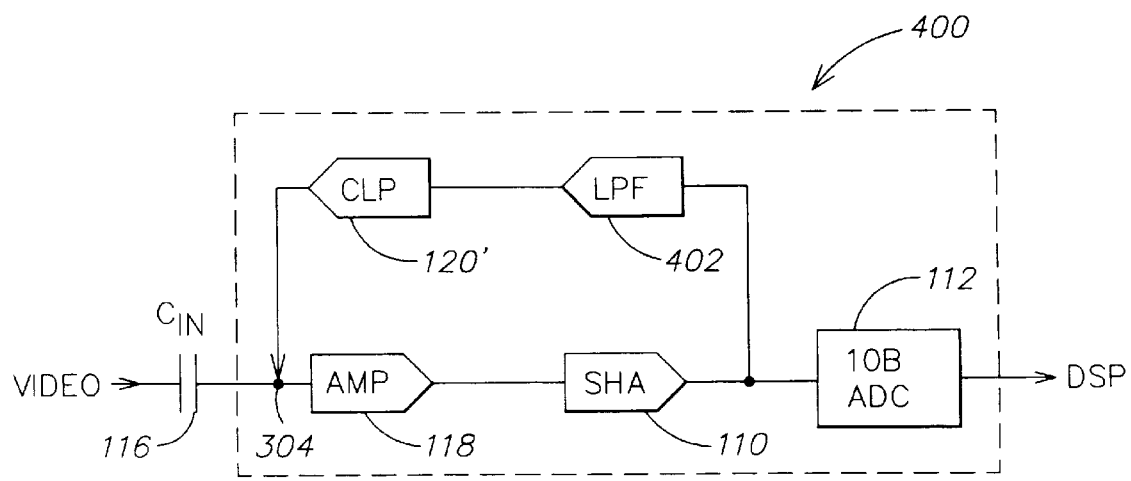
FIG. 4 is a block diagram of an embodiment of the present invention.

As shown in FIG. 4, a system 400 using the clamp circuit of the present invention includes the amplifier 118 having an input operatively coupled to the capacitor 116. An output of the amplifier 118 is operatively coupled to an input of the sample-and-hold amplifier 110. The ADC 112 has an input operatively coupled to the output of the sample-and-hold amplifier 110. In addition, a low-pass filter 402 has an input operatively coupled to the output of the sample-and-hold amplifier 110. A clamp circuit 120' has an input operatively coupled to the output of the low-pass filter 402. An output of the clamp circuit 120' is operatively coupled to the node 304 at the input to the buffer amplifier 118. As can be seen, the amplifier 118, the sample-and-hold amplifier 110, the low-pass filter 402 and the clamp circuit 120' create a feedback loop for the filtered video signal.

During operation, a video signal is filtered by the capacitor 116 to provide an AC-coupled signal at node 304. The filtered video signal is buffered by the amplifier 118 to provide a buffered filtered video signal to the sample-and-hold amplifier 110. The sample-and-hold amplifier 110 samples the buffered filtered video signal and provides a sampled video signal at its output. Another purpose of the sample-and-hold amplifier 110 is to act as a buffer between the amplifier 118 and the ADC 112. The ADC 112 may present a relatively large input capacitance, requiring a driving amplifier. The sample-and-hold amplifier 110 also regulates the common mode of the signal accurately, which is of a practical importance for low voltage operation. The ADC 112 receives the sampled video signal and outputs a digital word representing the value of the sampled video signal. The digital word output by the ADC 112 is received by subsequent digital signal processing circuitry.

The low-pass filter 402 receives the sampled video signal from the sample-and-hold amplifier 110 and outputs a low-pass filtered signal. The low-pass filter 402 can be an active switched-capacitor low-pass filter and functions to filter out high frequency signal noises or glitches which may look like the SYNC pulse. The clamp circuit 120' receives the output of the low-pass filter 402 and outputs a signal to the node 304 to set the voltage level at node 304 so that an output of the sample-and-hold amplifier is equal to the reference level $V_{REF}$ when the SYNC pulse is being received. By including both the amplifier 118, the sample-and-hold amplifier 110 and the low-pass filter 402 in the feedback loop, account is made for the operating characteristics of these devices.

Figure 5:
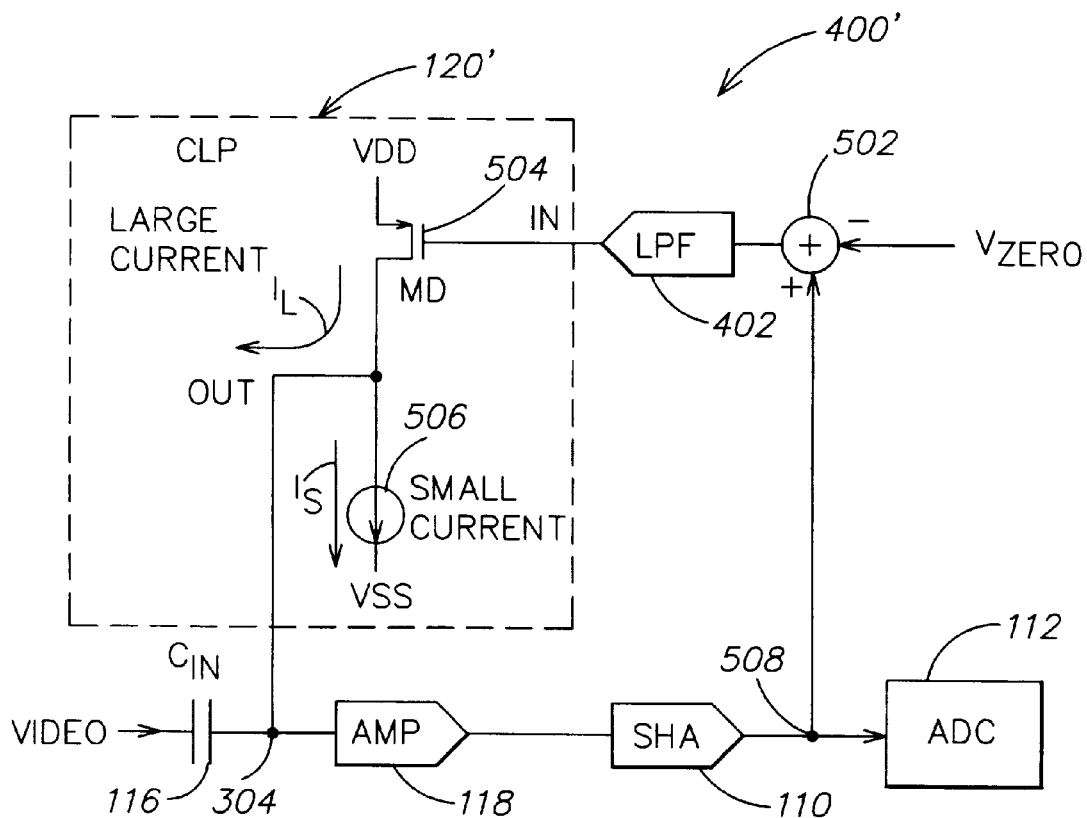
FIG. 5 is a conceptual diagram of the present invention.

As shown in FIG. 5, one embodiment of a system 400' using a video clamp circuit 120' is seen in further detail. System 400' is similar to system 400 shown in FIG. 4 except that a summer 502 is positioned between the sample-and-hold amplifier 110 and the low-pass filter 402. The summer 502 receives the output of the sample-and-hold amplifier 110 at one input and reference voltage $V_{zero}$ at another. The reference voltage $V_{zero}$ is the zero reference level which causes an output of the ADC 112 to be the digital word zero, e.g., all zeros or another selected reference number. The summer 502 outputs a signal equal to $V_{508}-V_{zero}$, where $V_{508}$ is the voltage at node 508.

PMOS transistor 504 has a gate operatively coupled to the output of the low-pass filter 402. A small current source 506 is operatively coupled between a drain element of the transistor 504 and a second voltage supply line receiving voltage $V_{ss}$. The drain element also is operatively coupled to the node 304. The clamp circuit 120' is activated when a level of the filtered video signal at node 304 causes an output of the sample-and-hold amplifier 110 to be less than $V_{zero}$. Since the SYNC pulse in the composite video signal attains a negative voltage value, the SYNC pulse turns on the PMOS transistor 504 to deliver a large current $I_L$ into the input capacitor 116. The clamp circuit 120' remains turned on until the rising edge of the SYNC pulse arrives to shut off the PMOS transistor 504. Subsequent to the turning off of PMOS transistor 504, a small current $I_S$, supplied by the small current supply 506, drains off from the input capacitor 116. As a result, a DC-level is established at the input such that when the bottom level of the SYNC pulse is received, the digital word output of the ADC 112 represents zero ("minus full-scale").

In this case, as shown in FIG. 5, the transconductance $Gm_{504}$ of the PMOS transistor 504 in combination with the capacitance of the input capacitor 116 ($C_{in}$) and the loop gain in the feedback loop provides a time constant of the circuit 400' which affects the acquisition time. The bandwidth $BW_{sys}$ of the system 400' is directly proportional to the transconductance of the system $Gm_{sys}$ where $Gm_{sys}=$ A*$Gm_{504}$, A being the DC gain of the system 400' consisting of the product of the DC gains of the amplifier 118, the sample-and-hold amplifier 110 and the low-pass filter 402. The bandwidth of the system, $BW_{sys}$, is related to the transconductance $Gm_{sys}$ by the following formula:

$$BW_{sys}=Gm_{sys}/C_{in}$$

As the value of $BW_{sys}$ decreases, the response time of the system increases and, conversely, as the value of $BW_{sys}$ increases, the response time decreases. Too high a bandwidth can result in a noisy system. The purpose of the small current $I_S$ is to provide an ability to pull down the signal level at node 304 in case this signal level is found to be too high. Effectively, the clamp circuit 120' is a diode clamp. The low pass filter 402 is inserted prior to the clamp circuit 120' to prevent any accidental signals or glitches from turning on the clamp circuit 120'.

The loop equilibrium is found when the current in the PMOS transistor 504 is equal to the small current $I_S$, which must be small in order to make the line droop insignificant to the luminance component of the video signal. A MOS device such as PMOS transistor 504 has a low transconductance Gm because the Gm of a MOS device is proportional to the square root of the drain current. Unless the device is sized very large, the time constant may result in a system which is too slow to suit a particular application.

Figure 6:
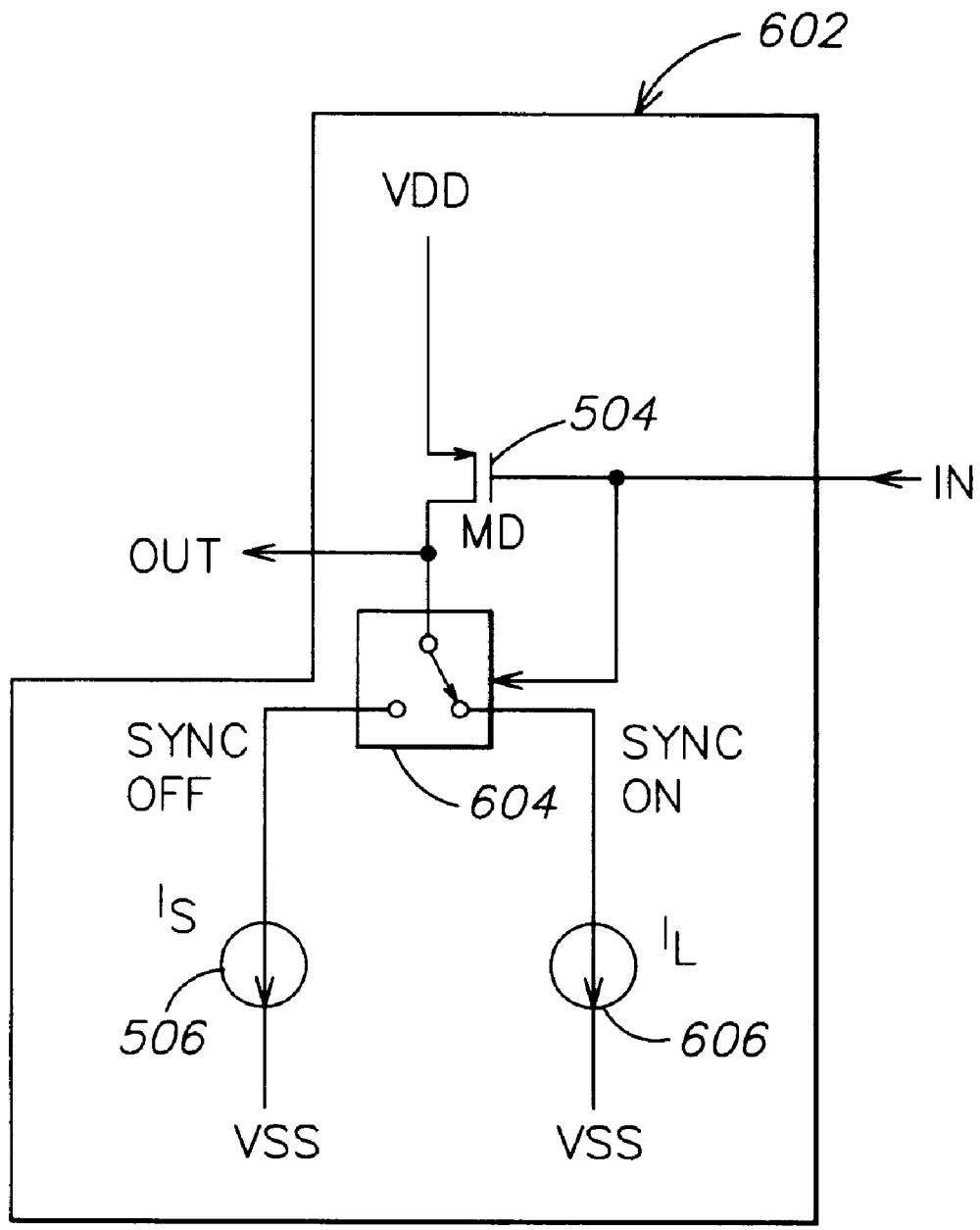
FIG. 6 is a schematic diagram of the clamp circuit of the present invention.

An alternative clamp circuit yielding a higher bandwidth that uses a PMOS transistor is shown conceptually in FIG. 6. As shown in FIG. 6, clamp circuit 602 includes the PMOS transistor 504 and the small current supply 506 as connected in clamp circuit 120'. In addition, unlike the circuit of FIG. 5, a switch 604 is positioned between the PMOS transistor 504 and the small current source 506. The switch 604 has a control element which is connected to the output of the low pass filter 402. A large current supply 606 is connected between one element of the switch and the second voltage line. The small current supply 506 is connected to another element of the switch 604. Depending upon a state of the switch 604, either the small current supply 506 or the large current supply 606 is operatively coupled to the drain of the PMOS transistor 504.

In clamp circuit 602, the transconductance Gm does not depend on the small current $I_S$. The feedback system 400' finds its equilibrium when the clamp circuit 602 stops charging the input capacitor 116 (not shown in FIG. 6). This occurs when the output current of the clamp circuit 602 is zero, i.e., the current in the PMOS transistor 504 is equal to the current sourcing the transistor at that time. As a result, when the SYNC pulse is on, "SYNC ON", i.e., when higher speed acquisition is needed, switch 604 operatively couples the PMOS transistor 504 to the large current supply 606 and the current through transistor 504 in excess of the large current $I_L$ is provided to node 304. When SYNC pulse is off, "SYNC OFF", switch 604 operatively couples the PMOS transistor 504 to the small current supply 506 and the small current $I_S$ is provided to node 304.

Figure 7:
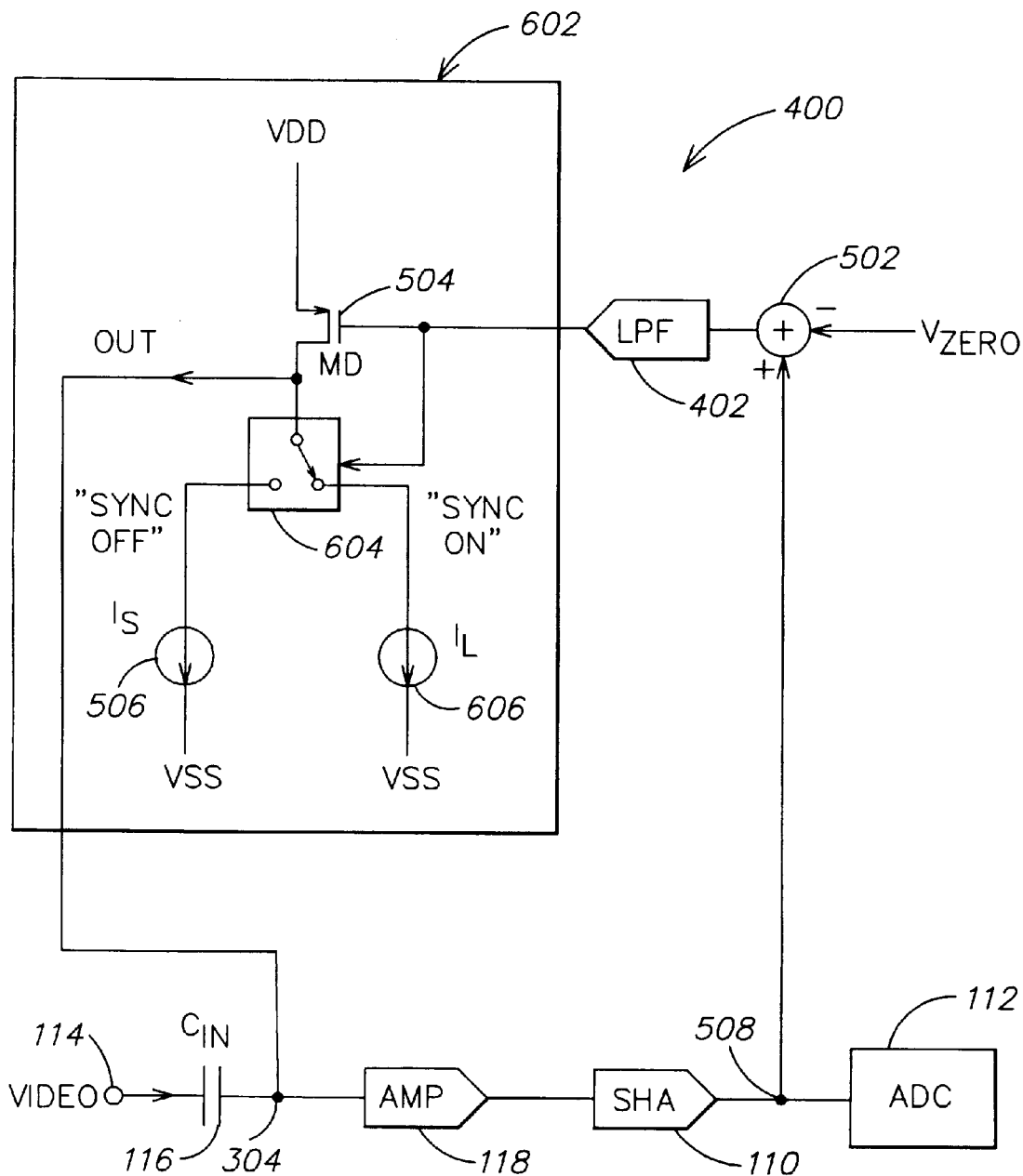
FIG. 7 is a block diagram of another embodiment of the present invention.

As shown in FIG. 7, the clamp circuit 602 replaces the clamp circuit 120' in the system 400. Operation of the circuit shown in FIG. 7 will now be discussed. A video signal is received at line 114 and is filtered by capacitor 116. The filtered video signal is amplified by buffer amplifier 118. The output of the amplifier 118 is sampled and held by sample-and-hold amplifier 110 to provide a sampled video signal at node 508. The voltage $V_{508}$ is compared by summer 502 to the minus full scale reference signal $V_{zero}$. When the SYNC pulse is present on the video input signal at line 114, the output of the low pass filter 402 will go low, as will a gate of PMOS transistor 504. PMOS transistor 504 will turn on and the switch 604 will operatively couple the large current source 606 to the PMOS transistor 504. A current will flow in transistor 504 and the current in excess of the large current $I_L$ will be pumped into input capacitor 116 which will raise the voltage at node 304 and increase the voltage at node 508 until equilibrium is reached, i.e., when the voltage at node 508 is equal to the minus full scale reference voltage $V_{zero}$. It is necessary, as can be seen, that this equilibrium be reached before the end of the SYNC pulse since the following rising edge turns off the PMOS transistor 504.

When equilibrium is reached, no more current will flow into node 304 and only the large current will flow in transistor 504. When the SYNC pulse ends, transistor 504 turns off, and the small current source 506 is switched in by the switch 604 in response to the output of the low-pass filter 402. The small current $I_S$ draws current from the capacitor 116 and is provided to assure that the voltage at node 304 is lower than the minus full scale level in case it starts out too high. In addition, the small current level can be controlled in order to limit the amount of droop in the circuit.

As described above, the transconductance $Gm_{504}$ of the PMOS transistor 504 determines the system bandwidth $BW_{sys}$. In actuality, the transconductance of the system $Gm_{sys}=Gm_{504}*$(dc gain of the system), where the dc gain of the system is determined by the gains of the amplifier 118, the sample-and-hold amplifier 110 and the low pass filter 402. The bandwidth of the system then is equal to $Gm_{sys}/C_{in}$. The clamp circuit 602 provides large transconductance Gm when the clamp 602 is turned on.

Figure 8:
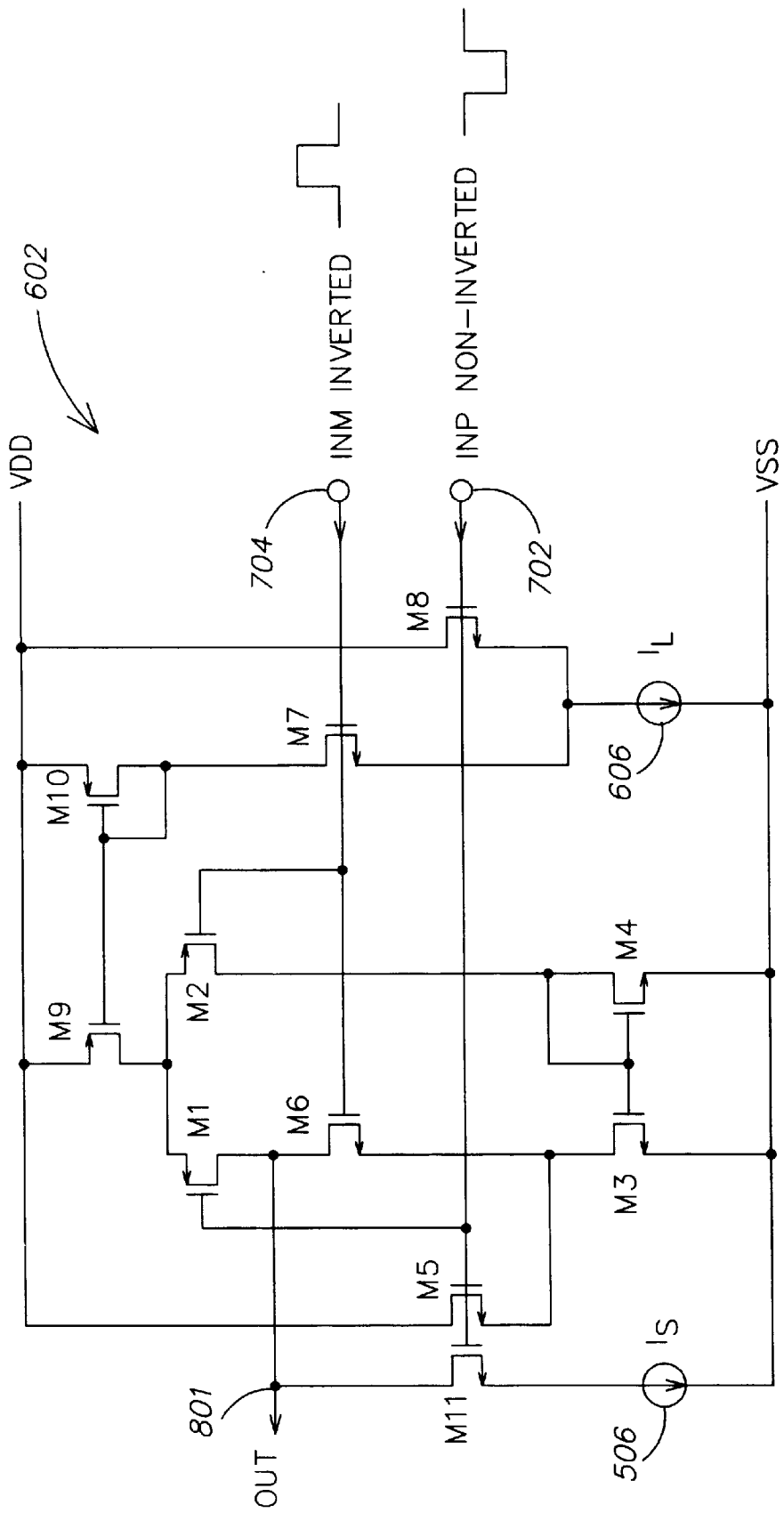
FIG. 8 is an embodiment of the video clamp circuit of the present invention.

An embodiment of the video clamp circuit 602 is shown in FIG. 8. In this implementation, a differential input is used.

The previously referred to figures showed single-ended signals for the sake of clarity. The output of the clamp circuit 602 remains a single-ended signal. As shown in FIG. 8, the embodiment of the video clamp circuit 602 is implemented with PMOS and NMOS transistors. A non-inverting input element 702 and an inverting input element 704 are provided. A switch circuit includes NMOS transistors M5–M8 and M11. Each of the transistors M6 and M7 has a gate element connected to the inverting input element 704. Each of transistors M5, M8, and M11 has a gate element connected to the non-inverting input element 702. Each of transistors M8 and M5 has a drain element connected to a first supply voltage line that receives supply voltage VDD. Each of transistors M6 and M11 has a drain element connected to an output line 801 of the video clamp circuit 602.

A large current supply 606 has a first element connected to a source element of each of transistors M7 and M8. A second element of the large current source 606 is connected to a second supply voltage line that receives supply voltage VSS. A small current source 506 has a first element connected to a source element of transistor M11 and the small current source 506 has a second element connected to the VSS voltage supply line.

A transconductance circuit includes PMOS transistors M1 and M2. A gate element of transistor M2 is operatively coupled to the inverting input element 704 and a gate element of the transistor M1 is operatively coupled to the non-inverting input element 702. A drain element of transistor M1 is operatively coupled to the output line 801 of the video clamp circuit 602 and to the drain element of transistor M6. Source elements of transistors M1 and M2 are operatively coupled to one another.

A first current mirror circuit includes PMOS transistors M9 and M10 each having a source element operatively coupled to the VDD supply line. A gate of each of transistors M9 and M10 are operatively coupled to one another with the gate of transistor M10 operatively coupled to the drain of transistor M10 and to the drain of transistor M7 of the switch circuit. A drain element of transistor M9 is operatively coupled to the mutually-connected source elements of transistors M1 and M2.

A second current mirror circuit includes NMOS transistors M3 and M4 with a source element of each of transistors M3 and M4 operatively coupled to one another and to the VSS supply line. A drain element of transistor M3 is operatively coupled both to a source element of the transistor M5 and the source element of transistor M6. Gate elements of each of transistors M3 and M4 are operatively coupled to one another with the gate element of transistor M4 operatively coupled to its drain element. The drain element of transistor M4 is further operatively coupled to the drain element of transistor M2 of the transconductance circuit.

Operation of the embodiment of the video clamp circuit 602 as shown in FIG. 8 will now be discussed. The transconductance circuit consisting of transistors M1 and M2 is analogous to PMOS transistor 504 shown in FIG. 7. The differential signals from the low pass filter 402 are received on lines 702, 704. When the SYNC pulse is received, the falling edge of the SYNC pulse will turn on transistor M7 causing a large current $I_L$ to flow through transistor M10, of the current mirror pair also including transistor M9. The current flowing in transistor M9 is a multiple of the current flowing through transistor M10 based on the current mirror ratio. The current flowing through transistor M9 also flows through transistor M1 which has been turned on, thereby supplying the large current $I_L$ to the input capacitor 116 which will charge capacitor 116 and raise the voltage level at node 304.

When equilibrium is reached, i.e., the input signals at the input lines 702, 704 are equal to each other, then both transistors M7 and M8 are turned on and therefore one half of the large current $I_L$ flows through each transistor (assuming they are equal in size). The transistor M10 carries current equal to half the large current $I_L$ and this is mirrored, as above, by transistor M9. At equilibrium, transistors M1 and M2 are both turned on and, since they are equal in size, one half of the current through transistor M9 flows through each of M1 and M2. Transistors M3 and M4 form the second current mirror pair. The current flowing through transistor M3 is equal to twice the current flowing in transistor M4 assuming a current mirror ratio of two. One half of the current flowing through transistor M3 flows through each of transistors M5 and M6, which are both turned on. The net result is that the current flowing through transistor M1 is equal to the current flowing through transistor M6 and, as a result, the large current $I_L$ is not provided to the capacitor 116 but rather dictates the transconductance Gm of transistors M1 and M2. In other words, when equilibrium is reached, the transconductance Gm of the circuit is enhanced. This is contrary to the clamp circuit 120', as shown in FIG. 5, where the transconductance Gm of that circuit is defined by the small current $I_S$. While it would be possible in clamp circuit 120' to increase the small current $I_S$ in order to increase the transconductance Gm, the performance of the circuit due to the increased droop would be adversely affected.

At the end of the SYNC pulse, i.e., the occurrence of the rising edge, all of the large current $I_L$ will flow through transistor M8 which is turned on and a negligible amount will flow through transistor M7 which is turned off. Consequently, there is no current flowing through transistor M10, no current flowing through transistor M9 and no current flowing through the transistors M1–M4. As can be seen, transistors M5 and M6 also have no current flowing through them. The transistor M11, however, is turned on and connects the small current source 506 to the output line 801 which is equivalent to the second position of the switch 604 when the "SYNC OFF" condition is reached. The small current $I_S$ then is supplied to the capacitor 116.

In summary, transistors M7 and M8 turn on/off the large current $I_L$. Transistors M5 and M6 provide a smooth transition from the "SYNC ON" state to the equilibrium state. Transistors M5, M6 operate so that when the large current $I_L$ is switched between transistors M7 and M8, they operate to steer the current from transistor M3 away from transistor M1. Transistors M1 and M2 provide a transconductance pair while transistors M9 and M10 bias transistors M1–M4. The transistor M11 provides a small constant current $I_S$ when the SYNC pulse is not present.

Figure 9:
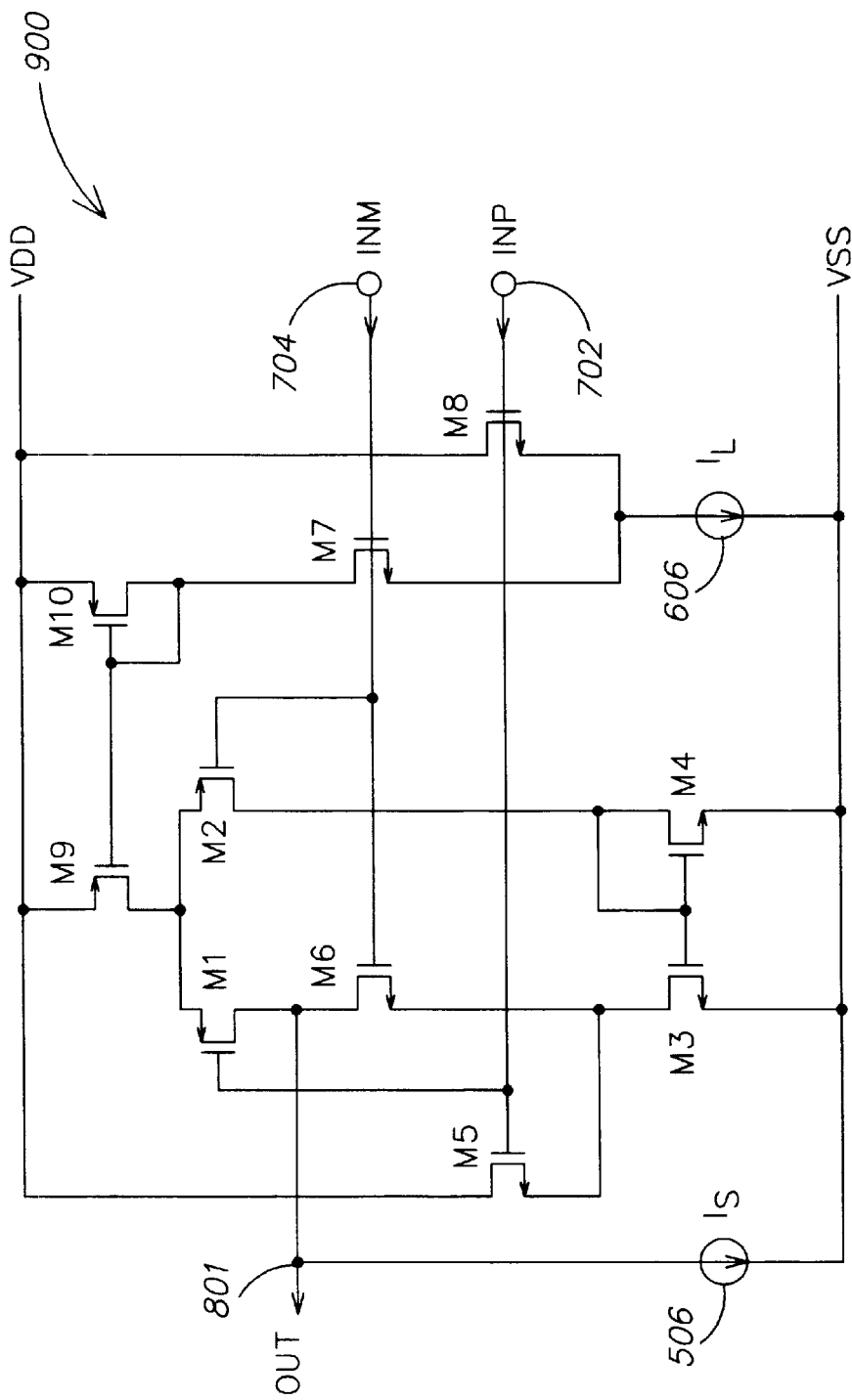
FIG. 9 is another embodiment of the video clamp circuit of the present invention.

The embodiment of the video clamp circuit 602 can be modified as shown in FIG. 9. All of the elements and their connections are the same as that shown in FIG. 8 with the exception of transistor M11. In the video clamp circuit 900, transistor M11 has been removed and the small current supply 506 is now operatively coupled directly to the output node 801. In operation, the current flowing to the output line 801 from transistor M1 is so much greater than the small current from current supply 506 that the small current has no effect on the clamping capabilities of the circuit.

It should be understood that while the video clamp circuit of the present invention was shown and described as a differential circuit, it alternatively could be a single-ended circuit and both are considered to be within the scope of the invention. Similarly, while certain of the transistors were described as PMOS and others of the transistors were described as NMOS, they were shown as exemplary and could be interchanged to suit a particular application.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A video signal processing circuit, comprising:
    a buffer amplifier having an input receiving an AC-coupled video signal, the buffer amplifier outputting a buffered video signal;
    a sample-and-hold amplifier having an input operatively coupled to the buffer amplifier, said sample-and-hold amplifier input receiving the buffered video signal and the sample-and-hold amplifier outputting a sampled video signal;
    a low-pass filter having an input operatively coupled to the sample-and-hold amplifier to receive the sampled video signal, the low-pass filter outputting a low-pass filtered video signal on a filter output; and
    a clamp circuit having an input operatively coupled to the low pass filter output to receive the low-pass filtered video signal and outputting a control signal to the buffer amplifier input.

2. A video signal processing circuit, comprising:
    a buffer amplifier having an input receiving an AC-coupled video signal, the buffer amplifier outputting a buffered video signal;
    a sample-and-hold amplifier having an input operatively coupled to the buffer amplifier, said sample-and-hold amplifier input receiving the buffered video signal and the sample-and-hold amplifier outputting a sampled video signal;
    a summer having a first input operatively coupled to the output of the sample-and-hold amplifier and a second input operatively coupled to a predetermined reference value signal
    to output a value equal to a difference between the predetermined reference value signal and the output of the sample-and-hold amplifier;
    a low-pass filter having an input operatively coupled to receive the output of the summer, the low-pass filter outputting a low-pass filtered signal on a filter output; and
    a clamp circuit having an input operatively coupled to the low pass filter output to receive the low-pass filtered signal and outputting a control signal to the buffer amplifier input.

3. The circuit according to claim 1, wherein the clamp circuit comprises:
    a MOS transistor having a gate, a first element and a second element, the gate being operatively coupled to the low-pass filter output, the first element being operatively coupled to a first reference voltage and the second element being operatively coupled to the buffer amplifier input;
    a switch having a control element and first and second switch elements, the control element being operatively coupled to the low-pass filter output and the first switch element being operatively coupled to the second element of the transistor;
    a first current source having first and second CS elements, the first CS element being operatively coupled to the second switch element and the second CS element being operatively coupled to a second reference voltage; and
    a second current source, different from the first current source, having third and fourth CS elements, the third CS element being operatively coupled to the buffer amplifier input and the fourth CS element being operatively coupled to the second reference voltage;
    wherein the switch operatively couples the first switch element to the second switch element according to a first state of the low-pass filter output to connect the first current source to the buffer amplifier input and operatively decouples the first switch element from the second switch element to disconnect the first current source from the second element of the transistor according to a second state of the low-pass filter output, the second state different from the first state.

4. The circuit according to claim 1, wherein the clamp circuit comprises:
    a MOS transistor having a gate, a first element and a second element, the gate being operatively coupled to the filter output, the first element being operatively coupled to a first reference voltage and the second element being operatively coupled to the buffer amplifier input; and
    a current source operatively coupled between the buffer amplifier input and a second reference voltage.

5. A video signal processing circuit, comprising:
    a buffer amplifier having an input receiving an AC-coupled video signal, the buffer amplifier outputting a buffered video signal;
    a sample-and-hold amplifier having an input operatively coupled to the buffer amplifier, said sample-and-hold amplifier input receiving the buffered video signal and the sample-and-hold amplifier outputting a sampled video signal;
    a summer having a first input operatively coupled to the output of the sample-and-hold amplifier, a second input operatively coupled to a predetermined reference value signal
    to output a value equal to a difference between the predetermined reference value signal and the output of the sample-and-hold amplifier;
    a low-pass filter having an input operatively coupled to receive the output of the summer, the low-pass filter outputting a low-pass filtered signal on a filter output; and
    a clamp circuit having an input operatively coupled to the low pass filter output to receive the low-pass filtered signal and outputting a control signal to the buffer amplifier input, wherein the clamp circuit comprises:
        a MOS transistor having a gate, a first element and a second element, the gate being operatively coupled to the filter output, the first element being operatively coupled to a first reference voltage and the second element being operatively coupled to the buffer amplifier input; and
        a current source operatively coupled between the buffer amplifier input and a second reference voltage.

6. The circuit according to claim 4, wherein the MOS transistor comprises a PMOS transistor, the first element being a source and the second element being a drain.

7. The circuit according to claim 1, wherein the clamp circuit comprises:

a MOS transistor having a gate, a first element and a second element, the gate being operatively coupled to the low-pass filter output, the first element being operatively coupled to a first reference voltage and the second element being operatively coupled to the buffer amplifier input;

a switch having a control element and first, second and third switch elements, the control element being operatively coupled to the low-pass filter output and the first switch element being operatively coupled to the second element of the transistor;

a first current source having first and second CS elements, the first CS element being operatively coupled to the second switch element and the second CS element being operatively coupled to a second reference voltage; and a second current source, different from the first current source, having third and fourth CS elements, the third CS element being operatively coupled to the third switch element and the fourth CS element being operatively coupled to the second reference voltage;

wherein the switch operatively couples the first switch element to the second switch element according to a first state of the low-pass filter output and operatively couples the first switch element to the third switch element according to a second state of the low-pass filter output, the second state being different from the first state.

8. The circuit according to claim 7, wherein the MOS transistor comprises a PMOS transistor, the first element being a source and the second element being a drain.

9. A video signal processing circuit, comprising:

a buffer amplifier having an input receiving an AC-coupled video signal, the buffer amplifier outputting a buffered video signal;

a sample-and-hold amplifier having an input operatively coupled to the buffer amplifier, said sample-and-hold amplifier input receiving the buffered video signal and the sample-and-hold amplifier outputting a sampled video signal;

a summer having a first input operatively coupled to the output of the sample-and-hold amplifier, a second input operatively coupled to a predetermined reference value signal to output a value equal to a difference between the predetermined reference value signal and the output of the sample-and-hold amplifier;

a low-pass filter having an input operatively coupled to the output of the summer, the low-pass filter outputting a low-pass filtered signal on a filter output; and a clamp circuit having an input operatively coupled to the low pass filter output to receive the low-pass filtered signal and outputting a control signal to the buffer amplifier input, wherein the clamp circuit comprises:

a MOS transistor having a gate, a first element and a second element, the gate being operatively coupled to the low-pass filter output, the first element being operatively coupled to a first reference voltage and the second element being operatively coupled to the buffer amplifier input;

a switch having a control element and first, second and third switch elements, the control element being operatively coupled to the low-pass filter output and the first switch element being operatively coupled to the second element of the transistor;

a first current source having first and second CS elements, the first CS element being operatively coupled to the second switch element and the second CS element being operatively coupled to a second reference voltage; and a second current source, different from the first current source, having third and fourth CS elements, the third CS element being operatively coupled to the third switch element and the fourth CS element being operatively coupled to the second reference voltage;

wherein the switch operatively couples the first switch element to the second switch element according to a first state of the low-pass filter output and operatively couples the first switch element to the third switch element according to a second state of the low-pass filter output, the second state being different from the first state.

10. A clamp circuit for establishing a signal reference level for an AC-coupled video signal, the circuit comprising:

an input line to receive a control signal, the control signal being a sampled value of the AC-coupled video signal;

an output line coupled to the AC-coupled video signal;

a MOS transistor having a gate, a first element and a second element, the gate being operatively coupled to the input line, the first element being operatively coupled to a first reference voltage and the second element being operatively coupled to the output line;

a switch circuit operatively coupled to the input line to receive the control signal and to the output line;

a first current source operatively coupled between the switch circuit and a second reference voltage; and a second current source operatively coupled between the switch circuit and the second reference voltage, a second current supplied by the second current source being smaller than a first current supplied by the first current source;

wherein the switch circuit operatively couples the first current source to the output line when the control signal is in a first state and wherein the switch circuit operatively couples the second current source to the output line when the control signal is in a second state, the first state of the control signal also turning on the MOS transistor.

11. The circuit according to claim 10, wherein the MOS transistor comprises a PMOS transistor, the first element being a source and the second element being a drain.

12. The clamp circuit as recited in claim 10 wherein the switch circuit comprises a MOS transistor having a gate operatively coupled to the input line.

13. A clamp circuit for establishing a signal reference level for an AC-coupled video signal, the circuit comprising:

an input line to receive a control signal, the control signal being a sampled value of the AC-coupled video-signal;

an output line coupled to the AC-coupled video signal;

a MOS transistor having a gate, a first element and a second element, the gate being operatively coupled to the input line, the first element being operatively coupled to a first reference voltage and the second element being operatively coupled to the output line;

a switch circuit operatively coupled to the input line to receive the control signal and to the output line;

a first current source operatively coupled between the switch and a second reference voltage; and a second current source operatively coupled between the output line and the second reference voltage, a second current supplied by the second current source being smaller than a first current supplied by the first current source;

wherein the switch circuit operatively couples the first current source to the output line when the control signal is in a first state and wherein the switch circuit operatively decouples the first current source from the output line when the control signal is in a second state, the first state of the control signal also turning on the MOS transistor.

14. A clamp circuit for establishing a signal reference level, comprising:

an inverting input element to receive an inverted input signal, the inverted input signal having a first state and a second state;

a non-inverting input element to receive a non-inverted signal, the non-inverted signal having a first state and a second state;

an output line;

a first current mirror circuit operatively coupled to a first reference voltage;

a switch circuit operatively coupled to the first current mirror circuit, the first reference voltage, and the inverting and non-inverting input elements;

a first current source operatively coupled to the switch circuit and the second reference voltage, the first current source providing a first current;

a transconductance circuit operatively coupled to the first current mirror circuit, the output line, and the inverting and non-inverting input elements;

a second current mirror circuit operatively coupled to the transconductance circuit, the switch circuit and the second reference voltage; and a second current source operatively coupled to the switch circuit and the second reference voltage, the second current source providing a second current smaller than a first current provided by the first current source;

whereby the switch circuit operatively couples the first current source to the output line according to the first state of the inverted input signal and operatively couples the second current source to the output line according to the second state of the inverted input signal.

15. The clamp circuit as recited in claim 14, wherein the transconductance circuit comprises:

a first MOS transistor having a source, a gate and a drain, the gate being operatively coupled to the non-inverting input element and the drain being operatively coupled to the output line; and a second MOS transistor having a drain, a gate and a source, the gate being operatively coupled to the inverting input element and the source being operatively coupled to the source of the first MOS transistor.

16. The clamp circuit as recited in claim 14, wherein the first current mirror circuit comprises:

a first mirror MOS transistor having a drain, a gate and a source, the source being operatively coupled to the first reference voltage and the drain being operatively coupled to the transconductance circuit; and a second mirror MOS transistor having a drain, a gate and a source, the source being operatively coupled to the first reference voltage, the drain being operatively coupled to its gate and the gate being operatively coupled to the gate of the first mirror MOS transistor.

17. The clamp circuit as recited in claim 14, wherein the second current mirror circuit comprises:

a third mirror MOS transistor having a drain, a gate and a source, the source being operatively coupled to the second reference voltage and the drain being operatively coupled to the switch circuit; and a fourth mirror MOS transistor having a drain, a gate and a source, the source being operatively coupled to the second reference voltage, the drain being operatively coupled to its gate, the transconductance circuit and to the gate of the third mirror MOS transistor.

18. The clamp circuit as recited in claim 14, wherein the switch circuit comprises:

a first switch MOS transistor having a gate, a drain and a source, the gate being operatively coupled to the non-inverting input element, the drain being operatively coupled to the first reference voltage and the source being operatively coupled to the first current source;

a second switch MOS transistor having a gate, a drain and a source, the gate being operatively coupled to the inverting input element, the source being operatively coupled to the first current source and the drain being operatively coupled to the first current mirror circuit;

a third switch MOS transistor having a gate, a drain and a source, the gate being operatively coupled to the inverting input element, the source being operatively coupled to the second current mirror circuit and the drain being operatively coupled to the output line;

a fourth switch MOS transistor having a gate, a drain and a source, the gate being operatively coupled to the non-inverting input element, the drain being operatively coupled to the first reference voltage and the source being operatively coupled to the second current mirror circuit; and a fifth switch MOS transistor having a gate, a drain and a source, the gate being operatively coupled to the non-inverting input element, the drain being operatively coupled to the output line and the source being operatively coupled to the second current source.

19. A clamp circuit for establishing a signal reference level, comprising:

an inverting input element to receive an inverted input signal, the inverted input signal having a first state and a second state;

a non-inverting input element to receive a non-inverted signal, the non-inverted signal having a first state and a second state;

an output line;

a first current mirror circuit operatively coupled to a first reference voltage;

a switch circuit operatively coupled to the first current mirror circuit, the first reference voltage, and the inverting and non-inverting input elements;

a first current source operatively coupled to the switch circuit and a second reference voltage, the first current source providing a first current;

a transconductance circuit operatively coupled to the first current mirror circuit, the output line, and the inverting and non-inverting input elements;

a second current mirror circuit operatively coupled to the transconductance circuit, the switch circuit and the second reference voltage; and a second current source operatively coupled to the output line and the second reference voltage, the second current source providing a second current smaller than a first current provided by the first current source;

whereby the switch circuit operatively couples the first current source to the output line according to the first state of the inverted input signal and operatively decouples the first current source from the output line according to the second state of the inverted input signal.

20. The clamp circuit as recited in claim 19, wherein the switch circuit comprises:

a first switch MOS transistor having a gate, a drain and a source, the gate being operatively coupled to the non-inverting input element, the drain being operatively coupled to the first reference voltage and the source being operatively coupled to the first current source;

a second switch MOS transistor having a gate, a drain and a source, the gate being operatively coupled to the inverting input element, the source being operatively coupled to the first current source and the drain being operatively coupled to the first current mirror circuit;

a third switch MOS transistor having a gate, a drain and a source, the gate being operatively coupled to the inverting input element, the source being operatively coupled to the second current mirror circuit and the drain being operatively coupled to the output line; and a fourth switch MOS transistor having a gate, a drain and a source, the gate being operatively coupled to the non-inverting input element, the drain being operatively coupled to the first reference voltage and the source being operatively coupled to the second current mirror circuit.

21. A circuit for setting an input signal level to a predetermined reference level comprising:

an input line to receive an input signal having an input signal level;

a first current source;

a second current source;

a summer circuit, operatively coupled to the input line and to a reference voltage having the predetermined reference level, to compare the input signal level to the predetermined reference level and output a first level when the input signal level is less than the predetermined reference level, a second level when the input signal level is substantially equal to the predetermined reference level and a third level when the input signal level is greater than the reference level; and a level setting circuit, operatively coupled to the output of the summer circuit, for setting the input signal level to the predetermined reference level by operatively coupling the first current source to the input line in response to the first level from the summer circuit, operatively coupling the second current source to the input line in response to the third level, and operatively decoupling the first current source from the input line in response to the third level from the summer.

22. The circuit according to claim 21, wherein the level setting circuit comprises:

a switch operatively coupled to the output of the summer circuit, the input line and the first and second current sources, the switch to operatively couple the first current source to the input line in response to the first level and to operatively couple the second current source to the input line in response to the third level and to operatively decouple the first current source from the input line in response to the third level.

23. A circuit for setting an input signal level to a predetermined reference level comprising:

an input line to receive an input signal having an input signal level;

a first current source;

a second current source operatively coupled to the input signal;

a summer circuit, operatively coupled to the input line and to a reference voltage having the predetermined reference level, to compare the input signal level to the predetermined reference level and output a first level when the input signal level is less than the predetermined reference level, a second level when the input signal level is substantially equal to the predetermined reference level and a third level when the input signal level is greater than the reference level; and a level setting circuit, operatively coupled to the output of the summer circuit, for setting the input signal level to the predetermined reference level by operatively coupling the first current source to the input line in response to the first level from the summer circuit and operatively decoupling the first current source from the input line in response to the third level from the summer circuit.

24. The circuit according to claim 23, wherein the level setting circuit comprises:

a switch operatively coupled to the output of the summer circuit, the input line and the first current source, the switch to operatively couple and operatively decouple the first current source to the input line in response to the first level and the third level, respectively.

25. A method for clamping a video signal to a reference level, the method comprising steps of:

removing a DC component from the video signal, through a coupling device, and producing an AC video signal;

comparing a level of the AC video signal to a first reference level;

when the AC video signal level is not greater than the first reference level, operatively coupling a first current source to a MOS transistor, turning on the MOS transistor and pumping current from the first current source into the coupling device to bring the AC video signal level to the first reference level; and when the AC video signal level is not less than the first reference level, turning off the MOS transistor and operatively coupling a second current source to the coupling device, a second current from the second current source being smaller than a first current from the first current source.

26. The method according to claim 25, wherein the step of removing the DC component from the video signal includes a step of AC-coupling the received video signal through a capacitor.

27. A method for clamping a video signal to a reference level, the method comprising steps of:

removing a DC component from the video signal, through a coupling device, and producing an AC video signal;

operatively coupling a first current source to the AC video signal;

comparing a level of the AC video signal to a first reference level;

when the AC video signal level is not greater than the first reference level, operatively coupling a second current source to a MOS transistor, turning on the MOS transistor and pumping current from the second current source into the coupling device to bring the AC video signal level to the first reference level; and when the AC video signal level is not less than the first reference level, turning off the MOS transistor and operatively decoupling the second current source from the coupling device where a first current from the first current source is smaller than a second current from the second current source.

\* \* \* \* \*